United States Patent [19]

Hitachi, Ltd. et al.

[11] Patent Number: 4,690,793
[45] Date of Patent: Sep. 1, 1987

[54] NUCLEAR FUSION REACTOR

[76] Inventors: Hitachi, Ltd., Tokyo, Japan; Hisanori Okamura, Toukai; Kunio Miyazaki, Hitachi; Hirosi Akiyama, Hitachi; Shinichi Itoh, Hitachi; Tomio Yasuda, Hitachi; Kousuke Nakamura, Hitachi; Yukio Okoshi, Mito; Mutuo Kamoshita, Katsuta; Akio Chiba, Hitachi, all of Japan

[21] Appl. No.: 581,076

[22] Filed: Feb. 17, 1984

[30] Foreign Application Priority Data

Feb. 18, 1983 [JP] Japan ................... 58-24633

[51] Int. Cl.$^4$ .............. G21B 1/00; B32B 15/04; B32B 15/20
[52] U.S. Cl. .................. 376/136; 376/150; 376/900; 428/617; 428/627; 428/632; 428/654; 428/674; 228/263.17; 228/263.18; 228/903
[58] Field of Search .......... 376/136, 150, 900; 428/617, 627, 628, 629, 632, 633, 634, 654, 674; 228/263.17, 263.18, 903; 420/493, 548

[56] References Cited

U.S. PATENT DOCUMENTS

| 3,197,859 | 8/1965 | Cape ............... | 228/238 |
| 3,720,257 | 3/1973 | Beutler et al. ........ | 164/75 |
| 3,911,553 | 10/1975 | Burgess et al. ......... | 228/173.1 |
| 4,019,080 | 4/1977 | Besson ............... | 313/317 |
| 4,357,299 | 11/1982 | Pattanaik ............ | 420/487 |
| 4,532,101 | 7/1985 | Doll ................. | 376/136 |

FOREIGN PATENT DOCUMENTS 838551 6/1960 United Kingdom ........ 376/136

OTHER PUBLICATIONS

Sager et al., Fusion Engineering Device (FED) First Wall/Shield Design, 10/81, pp. 1290-1294.
Brooks, The Technology of Controlled Nuclear Fusion, 5/78, pp. 873-882.
Rebut et al, Fusion Technology 1982, 1982, pp. 85-100.
Abdou, INTOR Impurity Control and First Wall System, 4/83, pp. 1-18.
Kiyama et al., Ceramic Toroidal Vacuum Chamber and Wall Conditioning for the ETL-TPE-2 Experiment, pp. 1562-1565.
Sevier et al., Design of the TFTR Phase II Bumper Limiter, pp. 1589-1592.

Primary Examiner—John F. Terapane
Assistant Examiner—Eric Jorgensen
Attorney, Agent, or Firm—Antonelli, Terry & Wands

[57] ABSTRACT

The nuclear fusion reactor of the present invention presents a new vacuum vessel for enclosing plasma particles where a reactor wall exposed to the above plasma particles has a piled structure. A plurality of heat-resisting ceramic tiles are metallurgically bonded to a metal-base body having a cooling means through a brazing material. The ceramic tiles are preferably composed of sintered silicon carbide of high density and containing a little beryllium oxide between the boundaries of crystal grains.

17 Claims, 9 Drawing Figures

NUCLEAR FUSION REACTOR

FIELD OF THE INVENTION

This invention is related to a new nuclear fusion reactor and especially to the improvement of the wall structure of a vacuum vessel of the reactor.

BACKGROUND OF THE INVENTION

Inside of a nuclear fusion reactor e.g. a torus-type nuclear fusion reactor, there is disposed a ring-like vacuum vessel for confining plasma therein. The vacuum vessel is surrounded by toroidal magnetic field coils which produce a magnetic field for keeping the plasma in a confined space. A plurality of the coils are distributed around the vacuum vessel at fixed intervals. A plurality of magnetic field coils are distributed along the vacuum vessel, to produce a magnetic field which heats the plasma and controls the position of the field.

As the materials for constructing the vacuum vessel, non-magnetic alloy steel containing nickel have been proposed. The vacuum vessel of the nuclear fusion reactor is deteriorated by the radiation of the nuclear fusion reaction, e.g. the irradiation of fast neutrons of 14 MeV. It was therefore proposed that Mo plate or W plate etc. of high melting point may be bolted to the water-cooled metal-base body of vacuum vessel as described in (Japanese Patent laid-open No. 55-94181).

But, Mo or W etc. have such large atomic numbers that they are sputtered by plasma particles and permeate the plasma and thus cause a reduction in the temperature of the plasma.

It is very disadvantageous for the nuclear fusion reactor which is exposed to high temperature and cooled with difficulty, that the thermal resistance between water-cooled metal-base body and Mo or W plates bolted thereto is large.

SUMMARY OF THE INVENTION

It is an object of this invention is to provide nuclear fusion reactors with a reactor wall made of strong structural members composed of composites which have an excellent cooling property, a small thermal stress and a ceramic property.

This invention is concerned with the nuclear fusion reactor which has a vacuum vessel for confining plasma, coils around the vacuum vessel to generate magnetic field, and a reactor wall to be exposed to plasma, the reactor wall having a piled construction by metallurgically bonding a number of separate pieces of a heat-resisting ceramic material to a water-cooled metal-base body by providing fixed gaps formed between adjoining ceramic pieces and by grooves formed in a corresponding part of the metal-base body underlying at least some of the gaps.

The ceramic pieces are desirable tiles to be bound to the metal-base body through an intermediate material to relieve the difference of thermal expansion between them. The intermediate material made of a metallic material is having a coefficient of thermal expansion intermediate between the tiles and the metal-base body. The metal-base body is desirably so constructed that it may avoid direct irradiation by plasma particles.

DETAILED DESCRIPTION OF THE INVENTION (1) Ceramic tile

Ceramic tiles must be excellently sputtering-proof against irradiation by plasma particles. Therefore, it is preferable for the ceramic material to be heat-resisting and especially to be made of compounds of elements of low atomic numbers. For the ceramic tiles, the coefficient of thermal expansion is preferable to be more than 0.05 cal/cm. sec. °C. and the electric resistance more than $10^{-3}\Omega\cdot$/cm at room temperature for both. The ceramic is less damaged by sputtering, if it has a higher coefficient of thermal conductivity, because of much cooling effect. Therefore, the temperature of ceramic tiles can be kept low enough to be resisting against sputtering, if its thermal conductivity is more than 0.4 cal/cm.sec. °C. If it has a high electric conductivity, it is given a strong magnetomotive-force by the magnetic field due to eddy current, as a strong magnetic field is generated in the reactor wall. Then, the material with the electric resistance of more than $10^{-3}\Omega\cdot$cm at room temperature is preferable to be used.

Ceramic tiles are composed of sintered ceramics of refractory compounds having a melting point higher than 1900° C. This temperature is needed for sputtering-proof property as well.

Oxides, carbides, nitrides, and silicides etc. of metals can be used as the material for ceramic tiles. Oxides e.g. BeO, MgO, $Al_2O_3$, $SiO_2$, CaO, $TiO_2$, $Cr_2O_3$, $Fe_2O_3$, $Y_2O_3$, $ZrO_2$ etc., carbides e.g. $Cr_3C_2$, NbC, ZrC, $Be_2C$, SiC, TiC, VC etc., nitrides e.g. AlN, $Si_3N_4$, TiN, VN, ZrN, NbN, TaN etc. and silicides e.g. Ti-silicide, Zr-silicide, V-silicide, Nb-silicide, Ta-silicide, Cr-silicide etc. can be used. Among various materials described above for ceramic tiles, especially compounds of elements of low atomic numbers less than 14 are preferable.

For example, compounds of Si, Al, Mg and Be are preferable. Such compounds as SiC, AlN, $Si_3N_4$, BeO, $Al_2O_3$, MgO and $SiO_2$, or the mixtures or compounds of them are preferable. The compounds described above are used as raw materials of sintered ceramics, while the other compounds which produce the compounds described above may be used.

Especially among ceramic tiles described before, the sintered ceramics which contains 0.1-5% of total Be in weight, in the form of metallic Be or a Be compound, the balance being 80% of silicon carbide in weight, is preferable material, because its thermal conductivity is much larger than 0.2 cal/cm.sec. °C. and the electric resistance is more than $10^8 \Omega \cdot cm$ at room temperature. The sintered silicon carbide ceramics, incorporate with a little quantity of beryllium oxide e.g. 0.05–10% in weight is especially preferable because its thermal conductivity is higher than 0.4 cal/cm.sec. °C. and the electric resistance is more than $10^8 \Omega \cdot cm$ at room temperature.

The separate ceramic tiles are joined metallurgically by various methods to the metal-base body with a cooling structure. The larger the surface area of the tiles is the more the manufacturing process is saved. But if the tile is too large, it becomes breakable because thermal stress increases after bonding to the metal substrate. Therefore, it is preferable to be 10 cm square and 20 mm thick at most. The thickness is rather better to be 5–10 mm. Ceramic tiles may be manufactured by pressureless sintering, pressure sintering or any other methods.

In order to avoid the irradiation of metal-base body of a solder material, by the plasma particles it is preferable to put one end of a ceramic tile upon the end of an adjacent tile to provide a protective covering. In order to arrange the ceramic tiles in an over lapping, manner edges are constructed to superimpose over each other. Instead of over-lapping the edges of ceramic tiles, the tiles may be arranged with a fixed gap and a ceramic bar may be inserted in the groove of the metal-base body.

(2) Metal-base body with cooling structure

The material of metal-base body must be non-magnetic at temperature for use. As metallic body, austenite steel, copper, copper alloy, aluminium, aluminium alloy, titanium, titanium alloy and nickel-base alloy can be used. The cooling structure is composed of the body piled up by partial seam welding, which has the space for flowing refrigerant, and the space is manufactured by putting the non-welded part of the constructed body in a form and expanding it with high pressure air. This is called corrugate structure. Another partial bonding method is diffusion bonding, pressure welding, brazing and so on.

Plural grooves are formed in the metal-base body. The hollow parts of the corrugate structure having the space made by high pressure air described above is utilized for the grooves. The necessary groove can be formed by cutting a metal plate. The grooves act to reduce a thermal stress when the ceramic tiles are bonded and the nuclear fusion reactor is in operation. The width of the groove may be wide enough lest neighbouring tiles should touch together forcing out the solder material between them when they are soldered. The neighbouring ceramic tiles are not bound because surplus solder flows into the groove and does not remain in the gaps between them. Consequently, the thermal stress by the cooling of metal base-body after bonding can be reduced.

More than 1 mm is preferable for the width of the groove, but the width should be small so long as enough bonding strength of ceramic tiles is obtained. The grooves can be made plurality in the same direction or in the both directions of length and breadth on the surface of the metal-base body. In case of manufacturing, the former is preferable, while the latter is preferable from the point of view of stress relief.

The metal-base body, on which plural ceramic tiles can be bonded, may be divided as well. The divided metal-base body is composed or the fixed form of the furnace wall of a nuclear fusion reactor by bonding mechanically to a constructive part. In constructing the metal-base body it is to be made with enough precision to eliminate surplus resistance against the flow of refrigerant. Also in the construction of each block of the metallic body, the ceramic tiles are bonded to cover the surface as described above lest the metallic body should be irradiated by the plasma particles.

(3) Bonding of the ceramic tile

Ceramic tiles are metallurgically bonded to the metal-base body. Metallurgical bonding includes e.g. brazing, diffusion bonding, anodic bonding etc. and does not include physical or mechanical bonding e.g. bolting, fitting, etc. The gaps made between each ceramic tiles reduce thermal stress, and relax the thermal stress of bonding layer by the contraction of metal-base body after bonding. Therefore, they do not only prevent the cracking and tearing off of the ceramic tiles but also bond tightly the tiles to the base-body.

The width of the gap is determined considering the volume of the expansion and contraction in operation. In case of the bonding layer by brazing, the melting point of bonding material must be lower than that of the metal-base body. Copper alloy containing manganese and silver are preferable for the bonding material when stainless steel and nickel base alloy are used for the metal-base body. These bonding materials can be used at about 900° C. The gap between tiles before bonding is as wide as the difference between the contraction of the metal-base body and that of ceramics in the cooling process from the bonding temperature to the room temperature, naturally including allowance.

Copper alloy containing manganese 25–55% in weight may preferably be used as a brazing material of copper alloys mentioned-above. The melting point of this alloy is 870°–1,000° C., therefore the bonding at comparatively low temperatures becomes possible. Especially, copper alloys containing manganese 35–45% in weight is preferable. This bonding material is available for the bonding of ceramic tiles composed of non-oxide ceramics and more effective for the bonding of carbide. The brazing material of copper-manganese alloys is effective for the bonding of such ceramics to a nickel base alloy, as to contain 0.1–5% in weight of Be and more than one kind of Be compounds and more than 80% in weight of silicon carbide and to have electric insulation at room temperature.

Silver solders in JIS standard can be available for the bonding at high temperatures. When the ceramics composed of metal oxide, e.g. alumina is bonded to a stainless steel or nickel base alloy, a silver solder should be imposed on the metallized layer of Mo-Mn etc. on the bonding surface.

In case of the metal-base body of aluminium or aluminium alloy, a brazing material of aluminium alloy containing silicon 8–15% in weight is preferable. This brazing alloy can braze at about 550°–620° C. The gaps between each ceramic tile before bonding are controlled according to a brazing temperature.

This brazing material is effective to bond ceramic tiles of sintered material, the principal ingredient of which is silicon carbide, to a substrate of aluminium or aluminium alloy.

In order to bond ceramic tiles to the metal-base body, each ceramic tile can be bonded by heating under its own weight or under the pressure of 1–20 kg/cm², the tiles are placed on the whole surface of the metal-base body with the bonding material located in between. The atmosphere during heating is air or non oxidizing gas.

The thickness or depth of the bonding layer is preferable to be 10–100 μm.

(4) Intermediate material

It is better for the intermediate material, which supports ceramic tiles on the metal-base body, to be composed of a metallic material having the intermediate coefficient of thermal expansion between those of ceramic tiles and metal-base body. For example, tungsten, molybdenum, invar alloy, metallic composite material and composite material of metals of high thermal conductivity with fibers of molybdenum, tungsten and carbon buried in them. Especially, the composite material of copper in which carbon fibers are buried, is preferable.

The carbon fiber reinforced copper composite material is prepared by hot-pressing stacked copper-clad carbon fiber cloths at a temperature high enough to unit the cloths. The copper-clad carbon fibers are covered by a thin copper film in the form of bundles. The bundles are woven two-dimensionally. This shows two-dimensionally equidirectional coefficient of thermal expansion. This composite material does not reduce the coefficient of thermal conductivity in the direction of the thickness of the composite. The composite has a coefficient of thermal expansion of $5-10\times10^{-6}/°C$. and thermal conductivity of 0.3–1.0 cal/cm. sec. °C. at room temperature. Carbon fibers are preferable to be 30–60% by volume. Up to 5% by weight of the elements (such as Ti, Cr, V etc.) for forming carbides with carbon fibers may be contained in the matrix of copper as well.

The intermediate material made of this copper-carbon fiber composite material is effective for bonding the above sintered silicon carbide ceramics to the metal-base body. When this intermediate material has the modulus of elasticity of $5-13\times10^3$ kg/mm$^2$ and the coefficient of thermal expansion of $3-12\times10^{-6}$ /°C. both at room temperature. It is effective for bonding the silicon carbide ceramics to the metal-base body. Materials other than copper-carbon fiber composite material can also be used for bonding the sintered silicon carbide ceramics to the metal-base body, if they have the same modulus of elasticity and coefficient of thermal expansion as above.

It is preferable for the intermediate materials to be bonded to the metal-base body with clearance between the materials such materials are arranged between grooves provided on the metal-base body like the ceramic tiles. The ceramics tiles are bonded on the intermediate materials with clearance between adjacent tiles. Instead of making grooves on the metal-base body having a cooling structure, the ceramic tiles may be bonded apart from each other on the intermediate materials with grooves made in the tiles.

It is preferable for bonding ceramic tiles of sintered silicon carbide to the above copper-carbon fiber composite material face to face to use the above copper-manganese alloy solder. In order to bond this copper-carbon fiber composite material to the metal-base body composed of aluminium, the above ceramic tiles and the above composite material are previously bonded by the above copper-manganese alloy solder. After that, the above composite material is put upon by aluminium, then heated till about 548° C. and bonded under a certain pressure. In this case, the above composite material whose the principal ingredient is copper can be bonded by eutectic reaction between the composite material and aluminium.

The thickness of the intermediate material is preferable to be more than 0.5 mm. Because the intermediate material, the thickness of which is more than 0.5 mm, can be used for the cushion which relieves enough the difference in the coefficient of thermal expansion at the bonding area between the ceramics and the metal-base body. The effect of the intermediate material is considered to be satulated when its thickness exceeds about 2 mm. Owing to the intermediate material, the larger area of the ceramic tiles can be bonded to the base without cracking, because the intermediate material reduces the thermal stress at the bonding area.

DETAILED DESCRIPTION OF PREFERRED EMBODIMENTS

EXAMPLE 1

Figure 1:
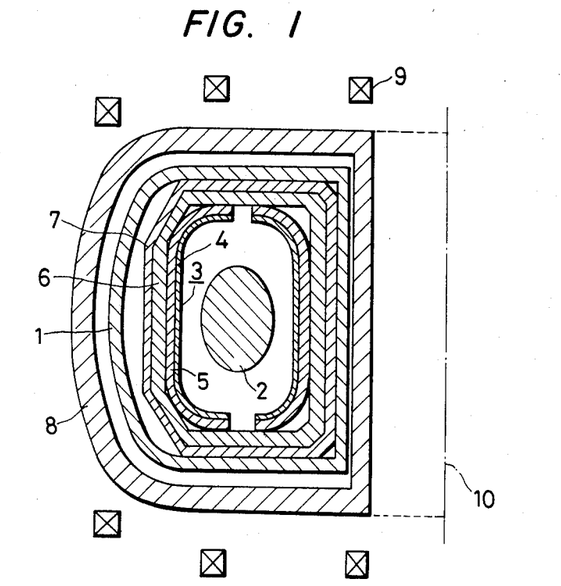
FIG. 1 is the sectional construction view of the vacuum vessel of a toroidal nuclear reactor of this invention.

FIG. 1 is the sectional view showing the outline of a torus-type nuclear fusion reactor as one example applying in the reactor wall construction of this invention. Vacuum vessel 1 is the ring-like (torus) around the center line 10 as base line and plasma 2 is generated in its space. The toroidal magnetic field coils 8, which generate a doughnut-like magnetic field for enclosing plasma 2 in the space of vacuum vessel 1, are distributed at the fixed interval along the round of the vacuum vessel. This magnetic coils 8 are composed of super electric conductivity coils which are cooled by liquid helium. Around the toroidal magnetic coils, plural poloidal coils 9 are distributed so as to control the position of plasma 2.

The inside of vacuum vessel 1 is evacuated by a vacuum exhauster (not shown). The reactor wall 3 of this invention is set up near the plasma 2, and breeding bracket 6 and shelter 7 are set up outside the reactor wall in the vacuum vessel 1. The reactor wall 3 is set up along the breeding bracket 6. The reactor wall 3 is constructed by bonding the ceramic tiles 4 to the metal-base body 5 which is provided with a cooling means where refrigerant is circulated.

Figures 2, 3:
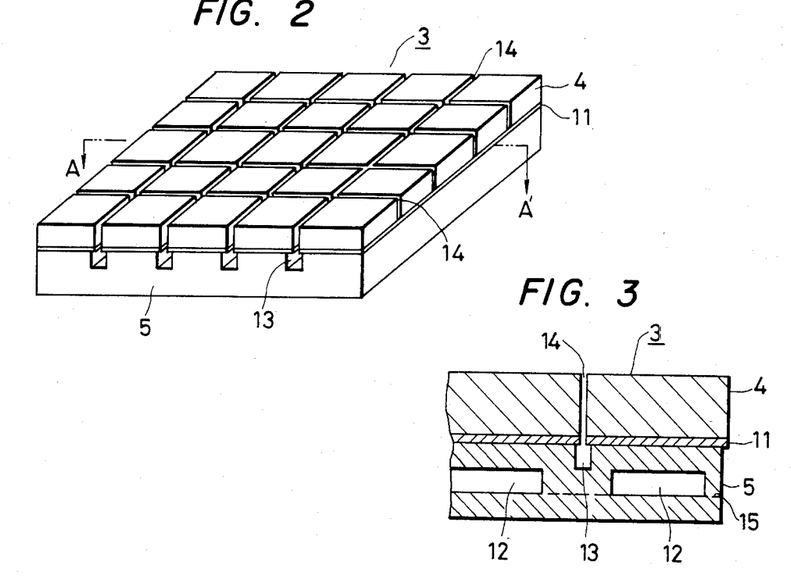
FIG. 2, FIG. 4 and FIG. 7 are oblique views of the reactor wall constructions of this invention.
FIG. 3 is the sectional plane view of section A—A' in FIG. 2.
Figure 4:
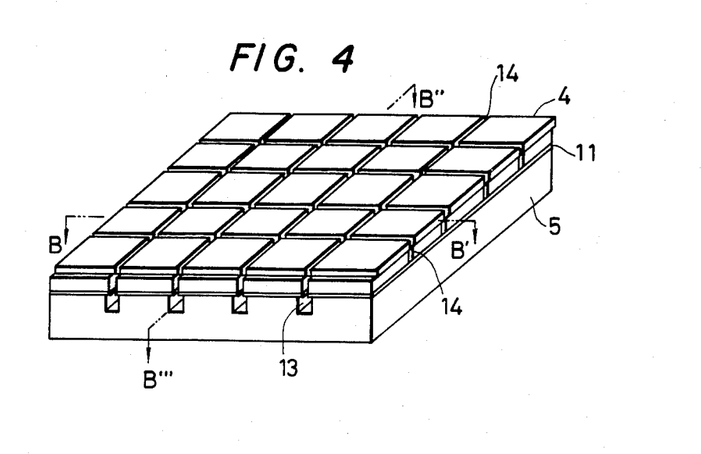
Figure 5:
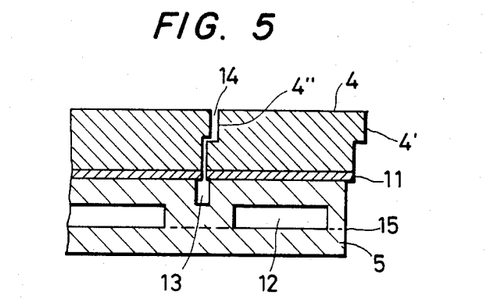
FIG. 5 is the sectional view of section B—B' in FIG. 4.

FIG. 2 is the drawing on the perspective showing a part of the reactor wall 3 of this invention. FIG. 3 is the sectional view of section A—A' in FIG. 2. The reactor wall 3 is constructed by bonding the ceramic tiles 4 to the metal-base body 5 having a cooling structure with path way 12 for the flow of refrigerant through the bonding layer 11. The ceramic tiles 4 are arranged with gaps 14 between them. Each assembly of FIG. 2 is bonded by welding, bolting, etc. and constructed as is shown in FIG. 1. 25 pieces of ceramic tiles 4 are bonded in FIG. 2, but these numbers may be variously changed. The dotted line 15 in FIG. 3 shows the bonding plane in case of the metal-base body 5 having a cooling structure. In the metal-base body 5 provided are grooves 13 in a direction logitudinally at the fixed interval. These grooves 13 may be made in both longitudinal and transverse directions as well. When the ceramic tiles 4 are bonded to the metal-base body 5 by the bonding material, the size of which is the same as the plane size of the metal-base body 5 or adapted to the size of ceramic tiles, an excess amount of a brazing material is let into the groove 13. Thus, the bonding of the ceramic tiles by the brazing material can be avoided. Moreover, a thermal stress can be reduced, because the expansion and contraction of ceramic tiles, which is caused by the heating and cooling during manufacturing or operating of the vacuum vessel, are not prevented. FIG. 4 is the oblique view of a part of reactor wall 3 in another case. FIG. 5 is the sectional view of section B—B' in FIG. 4. The ceramic tiles are so arranged that edges of the tiles are superposed lest the metal-base body should be directly irradiated by plasma 2. The ceramic tiles are formed stepwise with projecting part 4' and cut part 4", so as to combine the projecting part 4' with the cut part 4", therefore the metal-base body are prevented from being exposed to plasma through the gap 14. The projecting part 4' and cut part 4" are arranged in the longitudinal and transverse directions. In order to lap edges of the ceramic tiles over other edges of not adjoining tiles not to expose the metal-base body 5, its end is to be inclined or one side of the tile is to be let into another.

Figure 6:
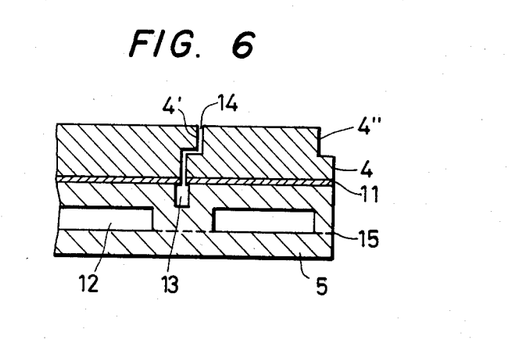
FIG. 6 is another sectional view of section B—B' in FIG. 4.

FIG. 6 is the sectional view of the reactor wall, in which ceramic tiles 4 are all made in the same form and bonded to the metal-base body alternating the top and bottom of tiles side by side in setting. This sectional view corresponds to that of the section B—B' of FIG. 4.

A concrete method for bonding ceramic tiles to the metal-base body is as follows. The metal-base body 5 was made of an aluminium plate, which was 5 mm thick, or a stainless steel plate of SUS 304 in JIS standard, which was 2 mm thick.

For the material of ceramic tiles of sintered $Si_3N_4$, the density of which was more than 98% of the theoretical density. Sintered ceramics of $Al_2O_3$ and SiC, which contained BeO 2% in weight, were also used. Beryllium oxide was observed as precipitates at the boundaries of crystal grains of SiC. The tiles are 10 mm thick and 20 mm × 20 mm square. The characteristics of these ceramics are shown in Table 1. The bonding surface of these was ground to the surface roughness to be less than 10 μm. As the brazing material, a foil of 25 μm thick, which is composed of Mn 40% in weight and the balance being Cu, was used for SUS 304, and a foil 50 μm thick, which is composed of Si 12% in weight and the balance being Al, was used for aluminium after the bonding surface of ceramic tiles was metallized. The ceramic tiles and the metal-base body were pressed under the pressure of 5–10 kg/cm² and heated in the atmosphere of Ar by a high frequency heating coil. The heating temperature was 860° C. for SUS 304, and 580° C. for aluminium. After heating, the assemblies were cooled in the air. The melted brazing material mostly remained between the bonding surfaces, but only a little was excluded from the bonding surfaces. In order to make a sintered SiC ceramics, a mixture of powder materials was molded under the pressure of 1,000 kg/cm² and then the molding was sintered by heating for one hour at 2,000° C. under the pressure of 300 kg/cm² in the atmosphere of $10^{-5}$–$10^{-3}$ torr.

It was ascertained that the above bonding method of ceramic tiles to metal-base body is very excellent in avoiding cracking or tearing off of ceramic tiles from the base body.

TABLE 1

| | Thermal Conductivity (cal/cm.sec.°C.) | Coefficient of Thermal Expansion (× $10^{-6}$/°C.) | Electric Resistance (Ωcm) | Melting Point (°C.) |
| --- | --- | --- | --- | --- |
| $Al_2O_3$ | 0.07 | 8.5 | >$10^{15}$ | 2040 |
| SiC | 0.65 | 3.7 | >$10^{14}$ | No melting point (Decomposition) |
| $Si_3N_4$ | 0.07 | 2.5 | >$10^{13}$ | 1900 |

EXAMPLE 2

Figure 7:
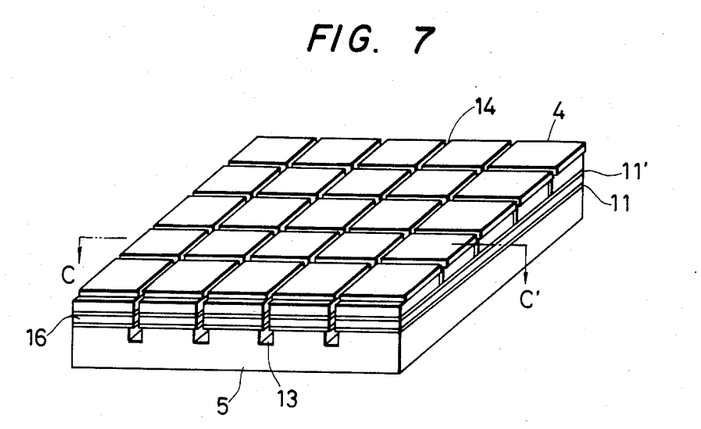
Figure 8:
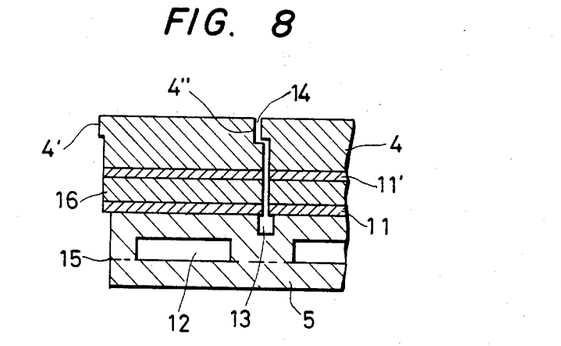
FIG. 8 is the sectional view of section C—C' in FIG. 7.

FIG. 7 is the oblique view showing one block composed of ceramic tiles 4 and metal-base body 5 with a cooling means, where they are bonded each other through intermediate material 16. FIG. 8 is the sectional view of section C—C' in FIG. 7. In this case gap 14 is made between ceramic tiles 4 as in FIG. 4, and the ends of ceramic tiles 4 are formed stepwise. Then the tiles are bonded so as to be lapped over each other lest the metal-base body 5 should be irradiated by plasma particle 2.

Groove 13 is made corresponding to the gap 14 in the metal-base body. The gap 14 can be smaller than the groove 13 in width, because it has only to prevent the generation of thermal stress by the thermal expansion in operation. The stress exerted on the ceramic tiles and the metal-base body can be reduced by selecting intermediate material 16 of a proper coefficient of thermal expansion at room temperature and proper modulus of elasticity. A bonding method is shown as follows. A sintered SiC ceramics of 10 mm thick and 40 mm square, which was made in the same way as in Example 1, was used as ceramic tiles, and copper-carbon fiber composite material was used as an intermediate material.

The copper-carbon fiber composite material was made by the next method. The carbon fibers of several μm in diameter was plated with copper in the thickness of several μm by electroless copper plating. A bundle of the copper-plated carbon fibers consisted of several thousands fibers and the bundle of fibers was woven into a plain weave. This weave was piled by 5 sheets and then heated and pressed at 800° C. in the atmosphere of nitrogen to make a sheet of composite material of 1 mm in thickness. A desired thickness can be obtained by stacking a necessary number of weaves. The composite material is useful from the view points of characteristics and smoothness of finishing. Besides weaving fabric, the method of curling fibers and the method of dispersing short fibers may be applied.

The Cu-C fiber composite material made as above and the sintered SiC were bonded by heating at 860° C. under the pressure of 5–10 kg/cm² through the bonding material which is composed of manganese 40% in weight and the rest being copper and is 50 μm thick. Three kinds of Cu-C fiber composite, which contain carbon fibers of 35%, 45% and 54% in volume respectively, were made. For the other kinds of intermediate material, verious metals and alloys of different coefficient of thermal expansion and different modulus of elasticity were used. These intermediate materials are an invar alloy containing Ni35% and Ni42%, kovar, SUS430, hastelloy B, pure Ni, Mo, and W.

A brazing material, which is composed of Mn 40% in weight and the rest being Cu and is 50 μm thick, is interposed between the sintered SiC and the above intermediate material. Then a foil of silver solder, which is composed of Cu 30% in weight and Ag 70% in weight and is 100 μm thick, is interposed between the intermediate material and a SUS304 stainless steel plate. The assembly was heated at 860° C. under the pressure of 5–10 kg/cm² in the atmosphere or Ar to unit altogether.

Figure 9:
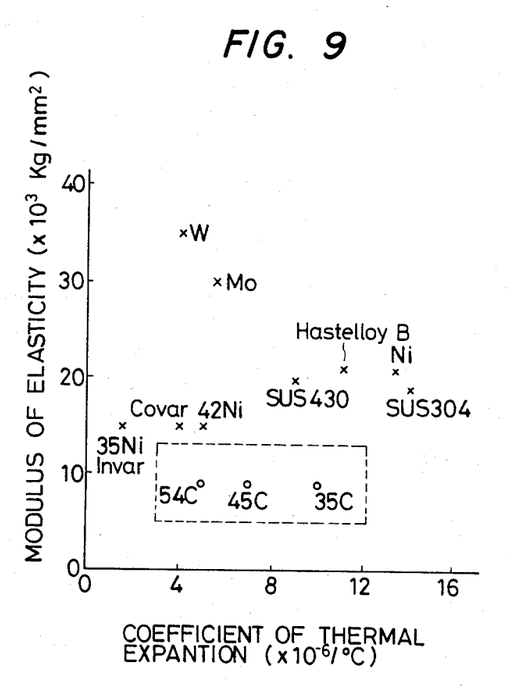
FIG. 9 is the diagram showing the relation between the modulus of elasticity and coefficient of thermal expansion of the intermediate material.

FIG. 9 shows the coefficient of thermal expansion at room temperature and modulus of elasticity of the above various intermediate materials which were used and the bonding properiety. The Cu-C fiber composite material can be bonded without any cracking and tearing off, because its modulus of elasticity can be selectively regulated by the quantity of carbon fibers. In the figure, mark X shows the case of cracking in the sintered SiC, mark Δ shows the case of bonding strength of less than 5 kg/mm², and mark o shows the case of bonding strength of more than 30 kg/mm². It became clear that a high bonding strength was obtained when the intermediate material had the coefficient of thermal expansion of $3-12\times10^{-6}/°C$. at room temperature and modulus of elasticity of $5-13\times10^{13}$ kg/mm².

EXAMPLE 3

It showed that an aluminium plate of 5 mm thick was used as the metal-base body. The carbon fiber-copper composite material of 1 mm thick containing carbon fibers of 35% in volume, which was hot-pressed weaves piled by five sheets of the above carbon fiber bundles, was used as the intermediate material. This composite was bonded in advance to the above sintered SiC ceramics by the brazing material composed of Mn 40% in weight and the rest being Cu. After that, the bonding surface of copper-carbon fiber composite material was placed on the metal-base body of aluminium through the copper foil of 100 μm, and then they were bonded by a eutectic reaction method 'where the reaction takes place between copper and aluminium at 580° C. under the pressure of 5-10 kg/cm² in the atmosphere of Ar.

Table 2 shows the result of heat load test irradiating laser beam on the surface of the ceramic tiles which was set up by the above method. In the heat load test, laser beam of 300 W/cm² was irradiated on the surface of ceramic tiles at a 100 second period. In this case, water of 8 l/min was flowed as the refrigerant for the metal-base body. As shown in the table, any break down or tearing from the bonding part of the ceramic tiles was not observed even after 1000 times of heat load tests. And it was proved that heat dissipating characteristics were excellent, because the surface temperature of ceramic tiles and the temperature of the bonding part between ceramic tiles and the metal-base body were very low.

EXAMPLE 4

The metal-base body, which had a corrugated structure made of an aluminium plate of 5 mm thick in stead of SUS 304, was used. Beforehand, SiC ceramics and Cu-C fiber composite material were bonded. For bonding this Cu-C fiber composite material to the metal-base body, bonding material, which was composed of Si 12% in weight and the rest being Al and was 50 μm thick, was used and they were heated at 580° C. under the pressure of 5-10 kg/cm², in the next place, taken out of the furnace. Then, one side of the assembly was cooled and the other side was heated with burner.

In case of this Example, the bend towards the metal-base body could be reduced. The cracking and tearing off of SiC ceramics did not take place at all, besides the thermal stress of the bonding point of SiC sinter was low. When this reactor wall was bent on the side of ceramic tiles, the reactor wall, which was flat or concave on the side of ceramic tiles, could be made.

EXAMPLE 5

An alumina plate on the market, which was 10 mm thick and 40 mm square, was used as ceramic tiles. A corrugated JIS304 stainless steel plate, which was 5 mm thick and 287 mm square, was used as the metal-base body. The structure of this case was shown in FIG. 2 and FIG. 3.

The brazing material foil, which was composed of Mn 40% in weight and the rest being Cu and was 40 mm square and 50 μm thick, was placed on the metal-base body 5. 49 pieces of alumina tiles were placed at intervals of 1 mm on the brazing foil. This set was put in the electric furnace, and held in heating for 30 seconds at 870° C. under the pressure of 10 kg/cm² in the atmosphere of Ar, and then cooled in the air after it was taken out of the furnace. As a result the reactor wall was bent to be concave on the side of metal-base body, but the cracking and tearing off of sintered alumina did not take place at all. This bent can be removed by pressing the assembly on the side of ceramic tiles at room temperature, consequently the thermal stress of bonding part was remarkably relieved.

What we claim is:

1. A nuclear fusion reactor which comprises a vacuum vessel for enclosing plasma particles; coils distributed around the vacuum vessel for generating a magnetic field; and a reactor wall that is exposed to the plasma particles within said vacuum vessel; the reactor wall having a piled structure in which many separate heat-resisting ceramic tiles are bonded to a metal-base body operatively associated with cooling means, gaps being formed between neighboring ceramic tiles and said metal-base body having grooves formed at portions corresponding to at least some of the gaps; said ceramic tiles being formed of compounds of elements having atomic numbers less than 14 and being bonded by a brazing material forming a junction layer between the tiles and the metal-base body.

2. A nuclear fusion reactor according to claim 1, in which portions of the ends of the neighboring ceramic tiles lap over one another on a surface subjected to irradiation by the plasma particles.

3. A nuclear fusion reactor according to claim 1, in which the above ceramic tiles are bonded to the above metal-base body via an intermediate material composed of a metallic layer having smaller coefficient of thermal expansion that that of the above metal-base body at room temperature.

4. A nuclear fusion reactor according to claim 3, in which the intermediate material is a composite material composed of a metal and buried fibers an exhibits a coefficient of thermal expansion less than that of the metal-base body at room temperature.

5. A nuclear fusion reactor according to claim 3, in which the modulus of elasticity of the intermediate material is $5-13\times10^3$ kg/mm² at room temperature and coefficient of thermal expansion of the intermediate material is $3-12\times10^{-6}/°C$. at room temperature.

6. A nuclear fusion reactor according to claim 5, in which the intermediate material is a composite material containing Cu as the principal ingredient and buried carbon fiber 30-60% in volume.

7. A nuclear fusion reactor according to claim 1, in which the thermal conductivity of the ceramic tiles is more than 0.05 cal/cm.sec.°C. at room temperature and the electric resistance is more than $10^{-3}\Omega\cdot$cm at room temperature.

8. A nuclear fusion reactor according to claim 1, in which the ceramic tiles are sintered ceramics having a melting point and a decomposition temperature higher than 1900° C.

9. A nuclear fusion reactor according to claim 8, in which the ceramic tiles are sintered ceramics of compounds of elements, the atomic numbers of which are 14 or less.

10. A nuclear fusion reactor according to claim 1, in which the ceramic tiles are ceramics containing beryllium or a compound of beryllium and more than 80% in weight of silicon carbide.

11. A nuclear fusion reactor according to claim 1, in which ceramic tiles containing silicon carbide as the principal ingredient are bonded to a metal-base body comprised of non-magnetic austenite-stainless steel, through a brazing layer composed of manganese 22–55% in weight and the rest being copper.

12. A nuclear fusion reactor according to claim 11, in which ceramic tiles are bonded to an intermediate layer by a solder material composed of manganese 25–55% in weight and the rest being copper, wherein the intermediate layer is a composite material containing buried carbon fiber 30–60% in volume in a matrix of copper the intermediate layer being bonded to the metal-base body.

13. A nuclear fusion reactor according to claim 12, in which the composite material is bonded to a metal-base body composed of aluminium by a brazing material composed of an alloy containing Si 8–15% in weight and Al as the principal ingredient.

14. A nuclear fusion reactor according to claim 1, in which ceramic tiles containing silicon carbide as the principal ingredient are bonded to a metal-base body comprised of aluminium through a brazing layer of an alloy containing Si 8–15% in weight and Al has the principal ingredient.

15. A nuclear fusion reactor which comprises a reactor provided with a vacuum vessel for enclosing plasma particles, coils distributed around the vacuum vessel for generating magnetic field, and a reactor wall exposed to the plasma particles in the vacuum vessel, the reactor wall being a piled structure comprising heat-resisting ceramic tiles of a thermal conductivity more than 0.5 cal/cm.sec.°C. at room temperature which are bonded to a metal-base body, the metal-base body being provided with grooves and cooling means; said ceramic tiles being formed of compounds of elements having atomic numbers less than 14 and being bonded by a brazing material forming a junction layer between the tiles and the metal-base body.

16. A nuclear fusion reactor according to claim 15, in which the ceramic tiles are composed of sintered non-oxide ceramics containing silicon carbide and beryllium or compounds of beryllium.

17. A nuclear fusion reactor according to claim 16, in which the above non-oxide ceramics contains beryllium oxide and more than 80% by weight of silicon carbide.

* * * * *